US012633013B2

(12) United States Patent  (10) Patent No.: US 12,633,013 B2
Kee et al.  (45) Date of Patent: May 19, 2026

(54) REMOVING IMAGE OVERLAYS

(71) Applicant: Adobe Inc., San Jose, CA (US)

(72) Inventors: Eric Randall Kee, Pittsburgh, PA (US); Adam Ahmed Pikielny, Seattle, WA (US); Marc Stewart Levoy, Stanford, CA (US)

(73) Assignee: Adobe Inc., San Jose, CA (US)

( * ) Notice: Subject to any disclaimer, the term of this patent is extended or adjusted under 35 U.S.C. 154(b) by 151 days.

(21) Appl. No.: 18/426,758

(22) Filed: Jan. 30, 2024

(65) Prior Publication Data

US 2025/0117994 A1 Apr. 10, 2025

Related U.S. Application Data

(60) Provisional application No. 63/588,950, filed on Oct. 9, 2023.

(51) Int. Cl.
| | |
|---|---|
| *G06T 11/60* | (2026.01) |
| *G06T 5/50* | (2006.01) |
| *G06T 7/10* | (2017.01) |
| *G06V 10/24* | (2022.01) |

(52) U.S. Cl.
CPC ............... *G06T 11/60* (2013.01); *G06T 5/50* (2013.01); *G06T 7/10* (2017.01); *G06V 10/24* (2022.01); *G06T 2207/20221* (2013.01)

(58) Field of Classification Search
CPC .... G06T 5/50; G06T 5/60; G06T 5/77; G06T 7/10; G06T 11/60; G06T 2207/20221; G06T 2207/20081; G06V 10/24
See application file for complete search history.

(56) References Cited

U.S. PATENT DOCUMENTS

2012/0254369 A1* 10/2012 Gillard .............. H04N 21/4622
709/219

OTHER PUBLICATIONS

Zou et al. "Deep Adversarial Decomposition: A Unified Framework for Separating Superimposed Images", Aug. 5, 2020, IEEE Xplore, https://doi.org/10.1109/CVPR42600.2020.01282 (Year: 2020).*
Lecouat et al."High Dynamic Range and Super-Resolution from Raw Image Bursts" Jul. 29, 2022, https://doi.org/10.48550/arXiv.2207.14671 (Year: 2022).*
Jain, "Reflection Segmentation for Single Image Reflection Removal" Aug. 2020, https://eescholars.iitm.ac.in/sites/default/files/eethesis/ee15b107.pdf (Year: 2020).*
Ready Steady Excel , "Easily Remove Reflections from Images on the Samsung", Posted to YouTube Shorts by Ready Steady Excel [retrieved Oct. 3, 2023]. Retrieved from the Internet <https://www.youtube.com/shorts/w-SaKvQqMp4>, Jun. 4, 2023, 1 page.

* cited by examiner

*Primary Examiner* — Kee M Tung
*Assistant Examiner* — Thang Gia Huynh
(74) *Attorney, Agent, or Firm* — FIG. 1 Patents

(57) ABSTRACT

In implementation of techniques for removing image overlays, a computing device implements a reflection removal system to receive an input RAW digital image, the input RAW digital image including both a base image and an overlay image. Using a machine learning model, the reflection removal system segments the base image from the overlay image. The reflection removal system generates an output RAW digital image that includes the base image and displays the output RAW digital image in a user interface.

20 Claims, 8 Drawing Sheets

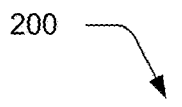
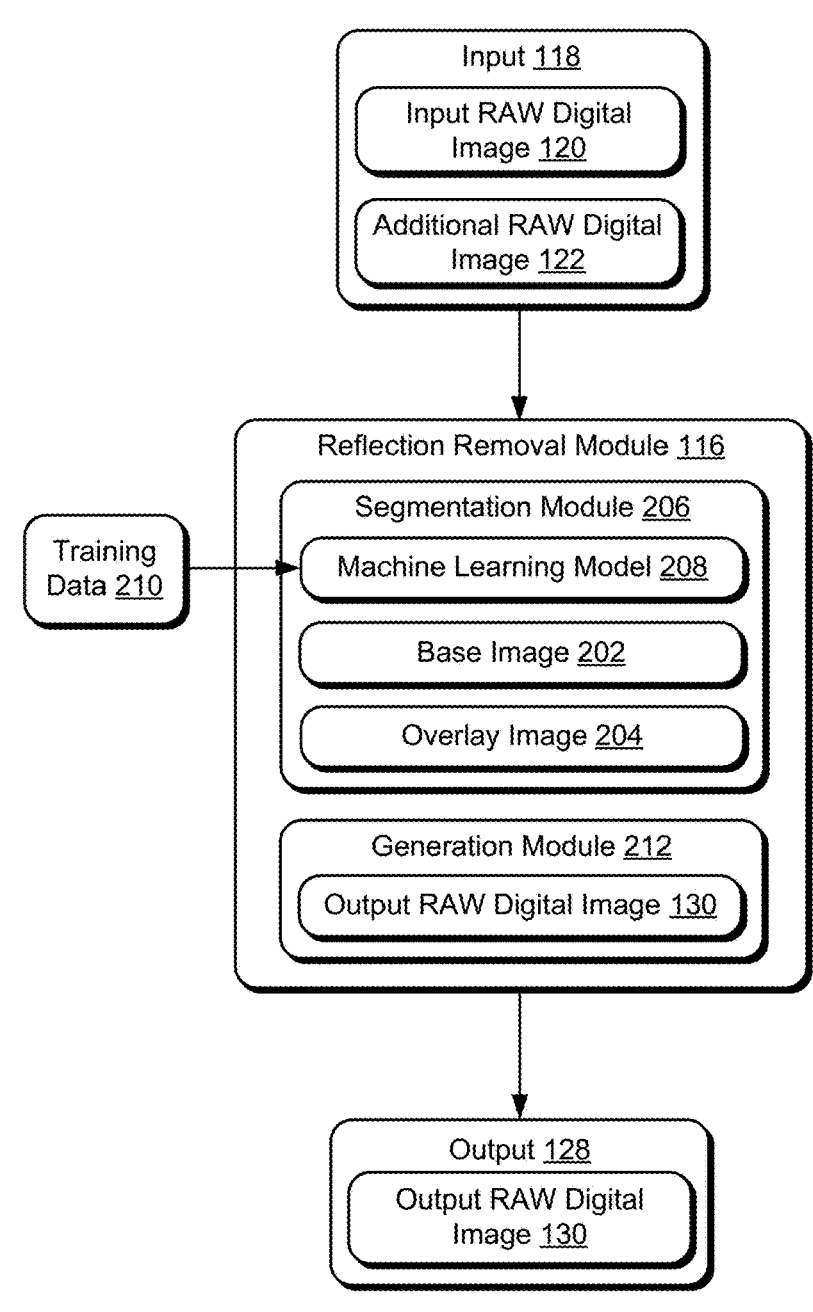
Fig. 2

600

602
Receive an input RAW digital image, the input RAW digital image including both a base image and an overlay image 604
Segment the base image from the overlay image using a machine learning model 606
Generate an output RAW digital image that includes the base image 608
Display the output RAW digital image in a user interface

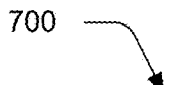

700

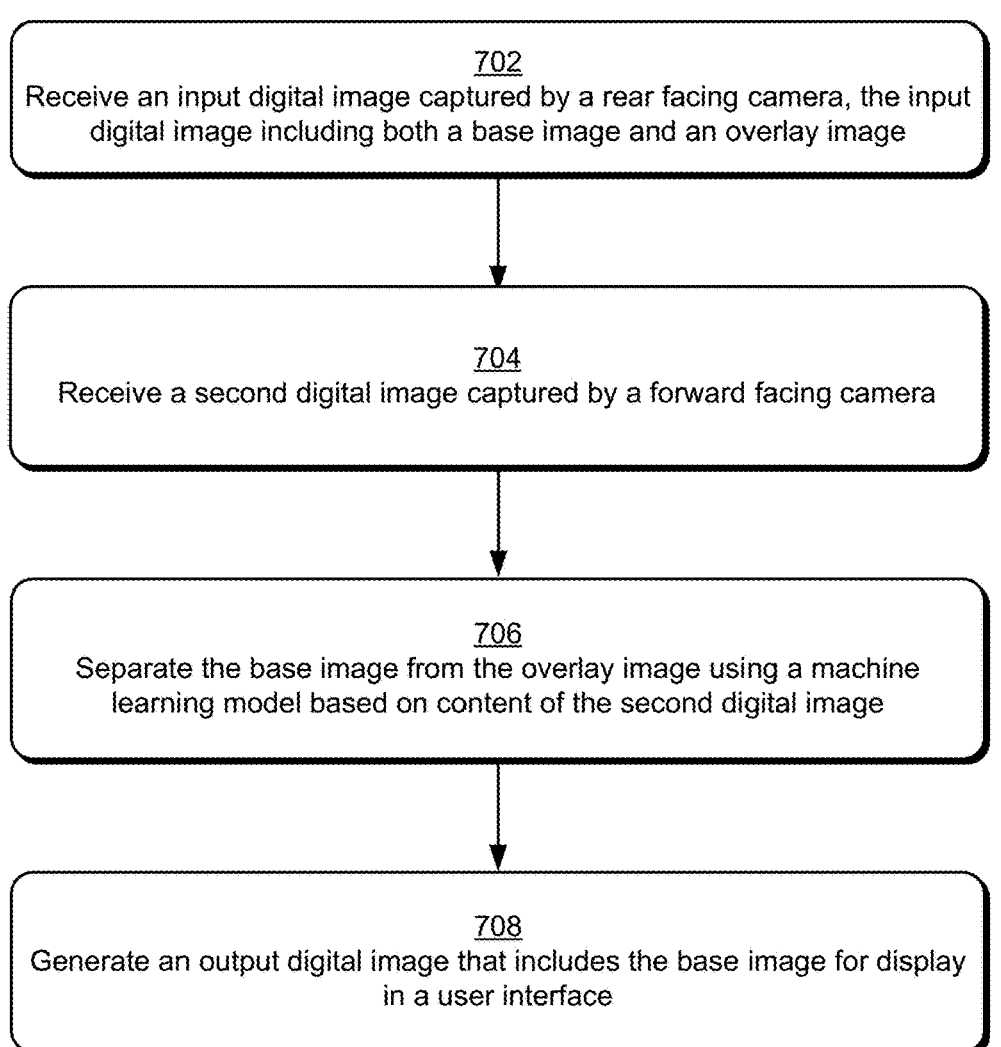

702
Receive an input digital image captured by a rear facing camera, the input digital image including both a base image and an overlay image 704
Receive a second digital image captured by a forward facing camera 706
Separate the base image from the overlay image using a machine learning model based on content of the second digital image 708
Generate an output digital image that includes the base image for display in a user interface

REMOVING IMAGE OVERLAYS

RELATED APPLICATION

This application claim priority under 35 U.S.C. § 119(e) to U.S. Provisional Patent Application No. 63/588,950, filed Oct. 9, 2023, and titled "REMOVING IMAGE OVER-LAYS," the entire disclosure of which is hereby incorporated by reference.

BACKGROUND

RAW digital images, referred to as RAW files or RAWs, are minimally processed digital image files captured by digital cameras or other image capture devices. These RAW digital image files contain data captured directly from the digital camera's sensor or contain data resulting from aligning and combining a burst of images, with minimal in-camera processing. In the RAW digital image files, pixel values remain linearly proportional to scene radiance, or are reverted to such proportionality. However, RAW digital images include undesirable anomalies in some situations. Conventional techniques to correct the anomalies cause errors and result in visual inaccuracies, computational inefficiencies, and increased power consumption in real world scenarios.

SUMMARY

Techniques and systems for removing image overlays are described. In an example, a reflection removal system receives an input RAW digital image, the input RAW digital image including both a base image and an overlay image. For example, the overlay image depicts a reflection and is layered over the base image in the input RAW digital image.

The reflection removal system segments the base image from the overlay image using a machine learning model. Some examples further comprise receiving an additional RAW input digital image captured from an angle that is different from an angle used to capture the input RAW digital image. For example, the additional RAW input digital image includes information about light in a physical environment captured by the input RAW digital image, and the machine learning model segments the base image from the overlay image based on the information about the light in the physical environment from the input RAW digital image. In some examples, the machine learning model is trained on RAW digital images formed by combining two RAW digital images.

The reflection removal system then generates an output RAW digital image that includes the base image. For example, the reflection removal system displays the output RAW digital image in a user interface. In some examples, the reflection removal system generates an additional output RAW digital image that includes the overlay image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

FIG. 2 depicts a system in an example implementation showing operation of a reflection removal module for removing image overlays.

FIG. 7 depicts a procedure in an additional example implementation of removing image overlays.

DETAILED DESCRIPTION

Overview

Figure 1:
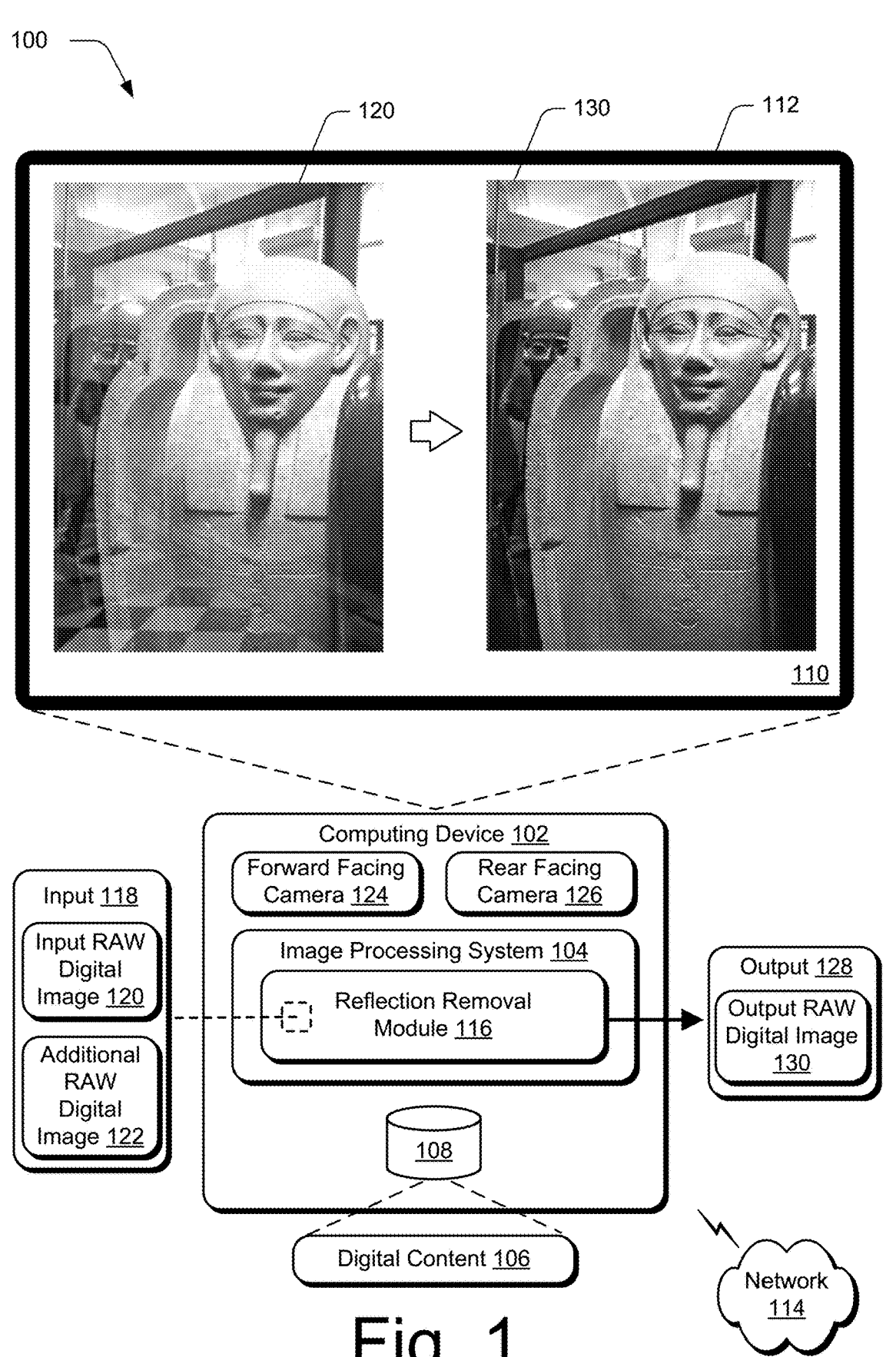
FIG. 1 is an illustration of a digital medium environment in an example implementation that is operable to employ techniques and systems for removing image overlays as described herein.

In photography, scenarios often occur in which a digital image is captured of a subject through a transparent surface. A window, a glass pane, or another transparent material, for example, is positioned between a digital camera that captures the digital image and the subject of the digital image. Although the subject is viewable through the transparent surface, a reflection of a user operating the digital camera, the digital camera, itself, and other scenery around the digital camera is often reflected onto the transparent surface as a result of light striking and reflecting off the transparent surface. The reflection is captured by the digital camera and results in a visual artifact as an unwanted composite image that depicts the reflection overlaying the intended subject in the digital image.

Conventional techniques have been developed to remove reflections from processed digital images. However, these conventional techniques have limited success in actually removing the reflections. This is because the conventional techniques do not account for environmental factors, including differences in lighting between sides of a transparent surface.

Accordingly, techniques and systems are described for removing image overlays that address these limitations. A reflection removal system begins in this example by receiving an input RAW digital image. The reflection removal system, for instance, operates on RAW digital images. RAW digital images, as previously described, contain data captured directly from a camera sensor or contain data resulting from aligning and combining a burst of such images, with minimal in-camera processing. This means that the input RAW digital image retains a linear proportion of pixel values to brightness of light in a scene and therefore includes additional information that is available to detect and remove reflections than the processed digital images used by conventional techniques.

The input RAW digital image includes a base image layered beneath an overlay image. For example, the base image depicts content intended for capture in the digital image. The overlay image is layered over the base image and depicts the reflection on the transparent surface.

To remove the reflection from the input RAW digital image, automatically and without user intervention, the reflection removal system segments the base image from the overlay image using a machine learning model. For example, the machine learning model is trained and retrained on artificial composite training images formed by combining different existing RAW digital images to simulate layered base images and overlay images. Once trained on the training images, the machine learning model is configured to successfully differentiate between the base image and the overlay image.

In some examples, the reflection removal system also receives an additional RAW digital image to aid the machine learning model in differentiating the base image from the overlay image. For example, the additional RAW digital image is captured from an approximate location and time as the input RAW digital image, but the additional RAW digital image is captured from a different angle. For example, the input RAW digital image is captured with a digital camera while facing the transparent surface and is then turned around to capture the additional RAW digital image from the opposite direction, or a forward facing digital camera is used to capture the additional RAW digital image as a "selfie" without turning around. Because the additional RAW digital image is captured in the direction facing away from the transparent surface (i.e., toward content that is reflected onto the transparent surface), the machine learning model collects information from the additional RAW digital image to determine which content in the input RAW digital image is part of the overlay image and which is not.

For example, the machine learning model identifies differences in lighting between the input RAW digital image and the additional RAW digital image to determine the differences between the base image and the overlay image. Content behind a transparent surface (i.e., captured in the input RAW digital image), for instance, is illuminated using artificial bright light, while content on the user's side of the transparent surface that includes the reflected content (i.e., captured in the additional RAW digital image) is illuminated using natural warm light. The machine learning model uses the differences in lighting to accurately segment the base image from the overlay image.

After the machine learning model segments the base image from the overlay image, the reflection removal system generates an output RAW digital image that includes the base image, without the overlay image, i.e., the base image independent of the overlay image. In some examples, the reflection removal system further processes the output RAW digital image into a finished output digital image for display in a user interface.

Removing image overlays in this manner overcomes the disadvantages of conventional reflection removal techniques that attempt to remove reflections from processed digital images. For example, receiving an input RAW digital image allows the machine learning model to leverage information related to environmental factors including lighting that is unavailable once a RAW digital image is processed. Additionally, input of the additional RAW digital image provides further information related to the reflection for the machine learning model to utilize while determining which content of the input RAW digital image corresponds to the reflection to accurately separate the overlay image from the base image.

In the following discussion, an example environment is described that employs the techniques described herein.

Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for removing image overlays described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 8.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a reflection removal module 116 which is illustrated as incorporated by the image processing system 104 to process the digital content 106. In some examples, the reflection removal module 116 is separate from the image processing system 104 such as in an example in which the reflection removal module 116 is available via the network 114.

The reflection removal module 116 is configured to remove a reflection, glare, or another unwanted content from a digital image. For example, reflections in images occur when an image is captured through a glass panel, resulting in an overlay of two images: a first image depicting content that is on the other side of the glass, and a second image depicting content reflected onto the glass.

To remove the reflection, the reflection removal module 116 first receives an input 118 including an input RAW digital image 120. For example, the input RAW digital image 120 includes at least layered images. A base image of the input RAW digital image 120 includes a salient image portion that a user desires to keep. However, an overlay image covers up at least a portion of the base image and obscures the base image from view. For instance, the overlay image has a degree of transparency, allowing portions of the base image to be seen through the overlay image. In the example depicted in FIG. 1, the overlay image includes a reflection of floor tiles that obscure the base layer, which is an image of an Egyptian sarcophagus in a museum.

In this example, the reflection removal module 116 also receives an additional RAW digital image 122, which is an optional supplemental RAW digital image. In this example, the input RAW digital image 120 is captured using a rear facing camera 124 (e.g., primary camera) associated with the computing device 102, and the additional RAW digital image 122 is captured using a forward facing camera 126 (e.g., "selfie" camera) associated with the computing device 102. In other examples, the input RAW digital image 120 and the additional RAW digital image 122 are captured using the same camera. In some examples, the additional RAW digital image is captured from a geographic location close to where the input RAW digital image 120 is captured but is captured from a different angle. In some examples, the additional RAW digital image 122 is captured as a "selfie" of the user using a forward facing camera. For example, the input RAW digital image 120 is captured using the rear facing camera 124 simultaneously as the additional RAW digital image 122 is captured using the forward facing camera 126. In other examples, the additional RAW digital image 122 is a cropped version of the input RAW digital image 120 or depicts scenery of the input RAW digital image 120. Information is used from the additional RAW digital image 122 to more efficiently and accurately segment the base image from the overlay image, as described in detail below.

After receiving the input RAW digital image 120, the reflection removal module 116 uses a machine learning model to separate the base image from the overlay image. The machine learning model is trained on multiple iterations of layered images. Because of this, the machine learning model identifies and segments the base image from the overlay image. In situations involving input of the additional RAW digital image 122, the machine learning model extracts information from the additional RAW digital image 122 to segment the base image from the overlay image. For example, the machine learning model compares lighting in the input RAW digital image 120 to lighting in the additional RAW digital image 122 to determine what portions of the input RAW digital image 120 include the base image or the overlay image.

After segmenting the base image and the overlay image, the reflection removal module 116 generates an output 128 including the output RAW digital image 130. For example, the output RAW digital image 130 includes the base image without the overlay image. This allows the user to view or incorporate the output RAW digital image 130 in other media without distractions of reflections from the overlay layer.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Removing Image Overlays

FIG. 2 depicts a system 200 in an example implementation showing operation of a reflection removal module for removing image overlays. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-8.

To begin in this example, a reflection removal module 116 receives an input RAW digital image 120. The input RAW digital image 120 includes a base image 202 and an overlay image 204. For example, the base image 202 is a primary image that a user desires to keep. The overlay image 204 is includes a reflection or glare that the user desires to remove. For example, the overlay image 204 is layered over the base image 202. Part of the base image 202 is visible through the overlay image 204, but the overlay image 204 obscures part of the base image 202, resulting in an input RAW digital image 120 with unsatisfactory aesthetic qualities.

The reflection removal module 116 also includes a segmentation module 206. The segmentation module 206 segments the base image 202 from the overlay image 204. To do this, the segmentation module 206 employs a machine learning model 208 trained on training data 210. For example, the training data 210 includes artificial composite images formed by layering image over another image to simulate base images and overlay images. When trained on the training data 210, the machine learning model 208 distinguishes a portion of the input RAW digital image 120 that includes the base image 202 and a portion of the input RAW digital image 120 that includes the overlay image 204.

In some examples, the reflection removal module 116 also receives an additional RAW digital image 122, which is captured from a different angle than the input RAW digital image 120. For example, a user captures the input RAW digital image 120 while facing a window display. The window in the input RAW digital image 120 includes a reflection of the user that the user wishes to remove. To aid the machine learning model 208 in removing the reflection, the user also captures the output RAW digital image 130 while turning around and facing away from the window display. The machine learning model 208 extracts information from the additional RAW digital image 122 to use to segment the base image 202 from the overlay image 204. For example, the input RAW digital image 120 and the additional RAW digital image 122 feature different amounts of light. This is one of multiple distinctions the machine learning model 208 uses to segment the base image 202 from the overlay image 204, as discussed in further detail below.

The reflection removal module 116 also includes a generation module 212. The generation module 212 generates an output RAW digital image 130 based on the base image 202. For example, the output RAW digital image 130 does not include the overlay image 204. The reflection removal module 116 then generates an output 128 including the output RAW digital image 130 for display in the user interface.

Figure 3:
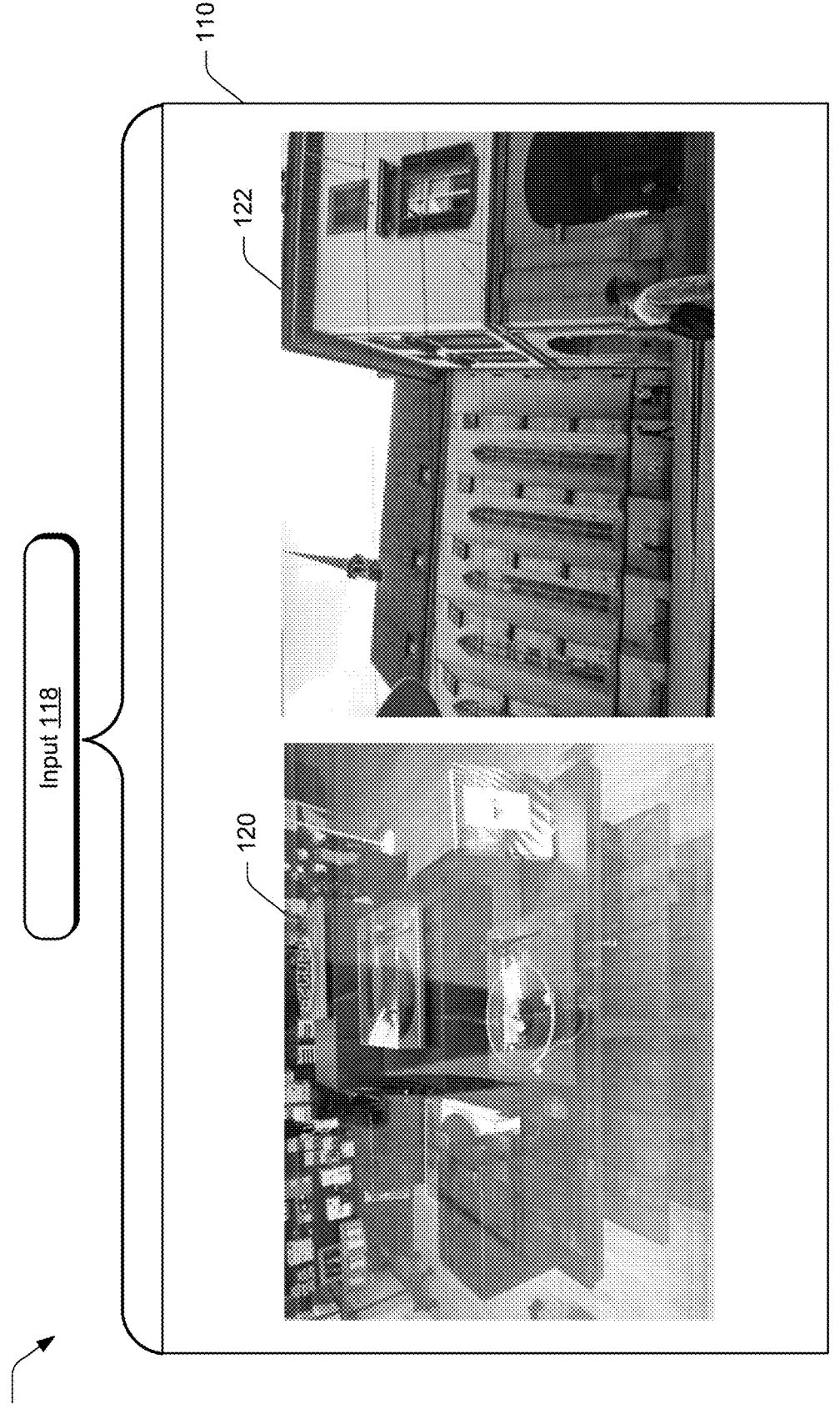
FIG. 3 depicts an example of receiving an input RAW digital image and an additional RAW digital image.
Figure 4:
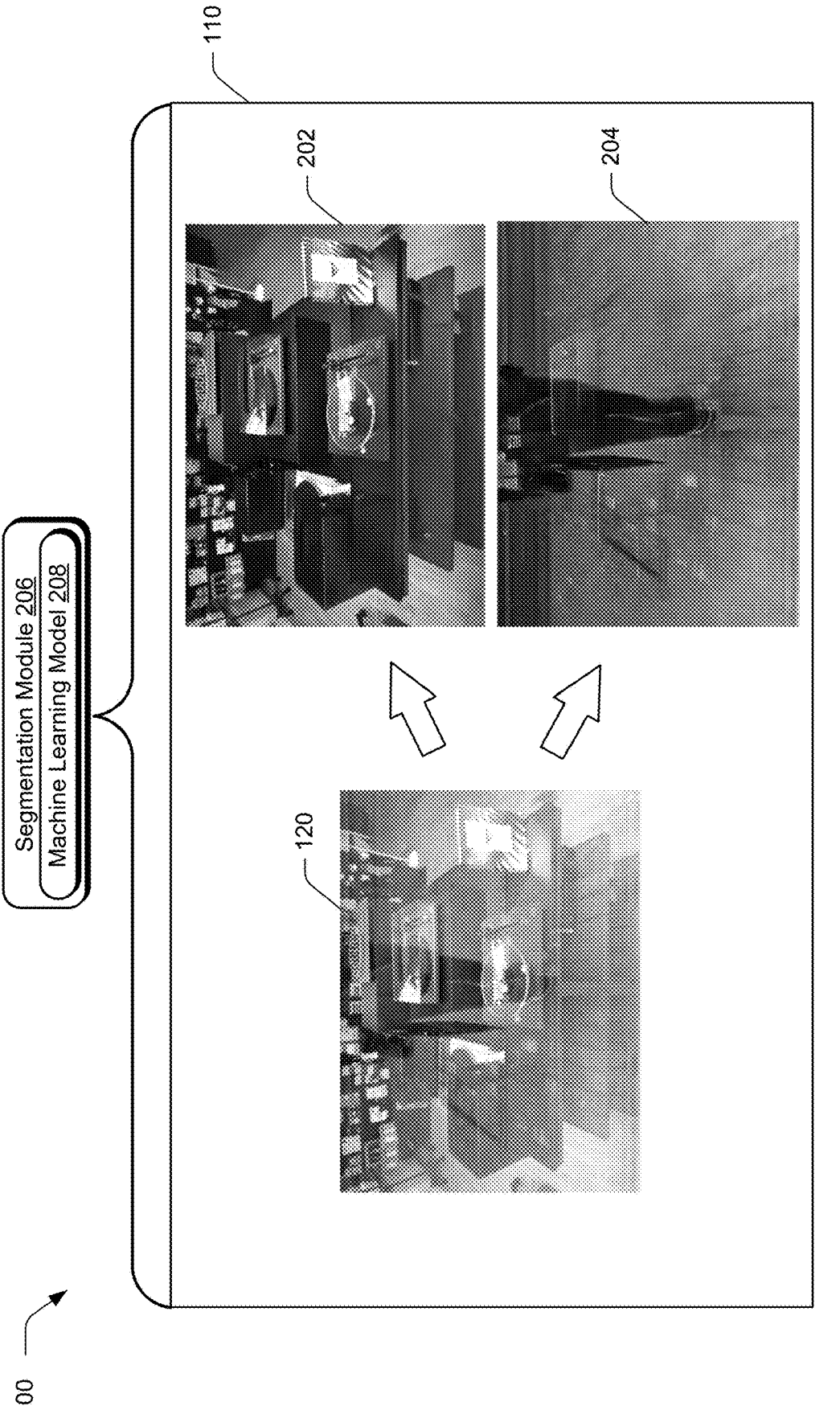
FIG. 4 depicts an example of segmenting a base image from an overlay image.
Figure 5:
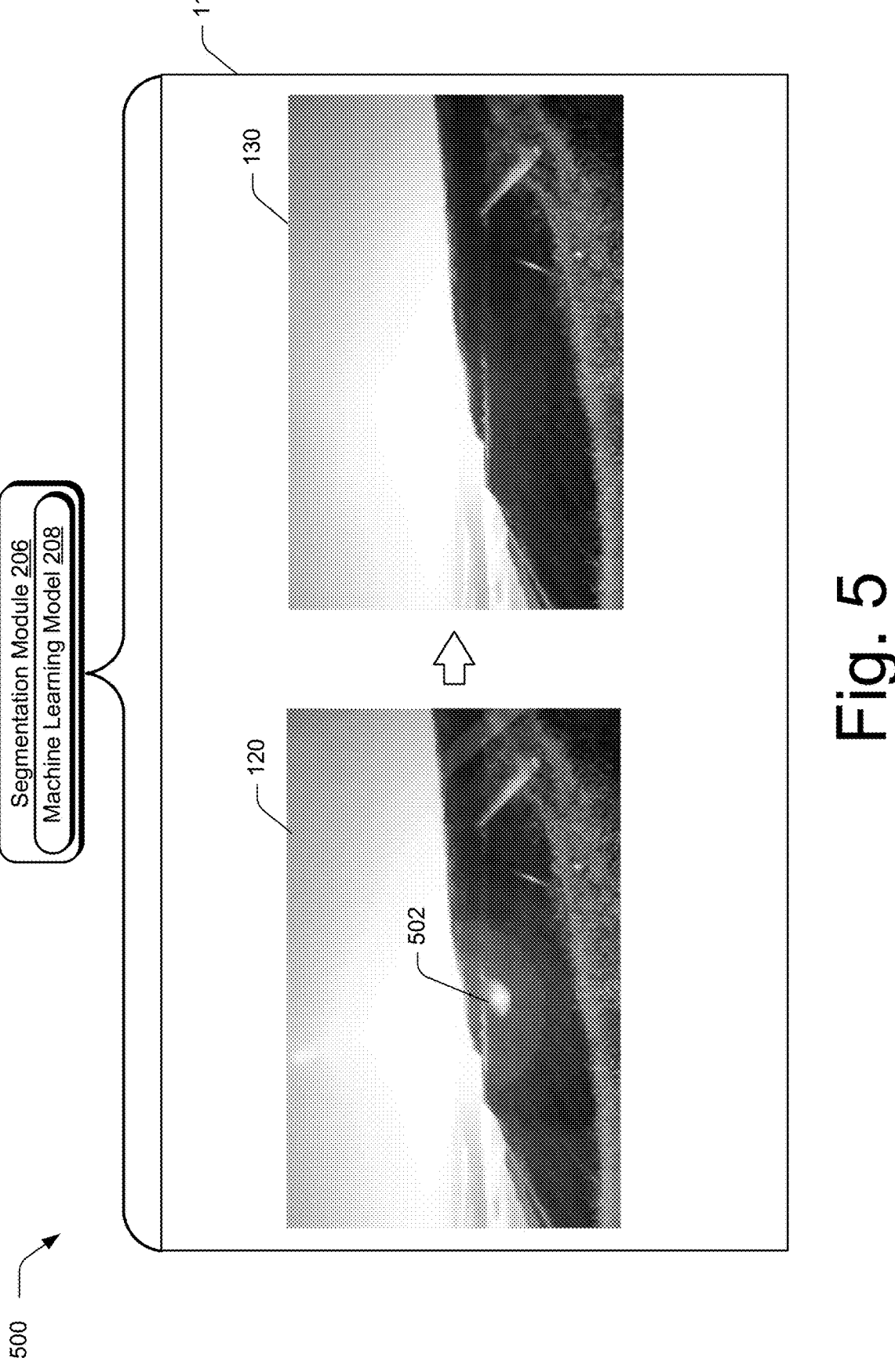
FIG. 5 depicts an example of removing a solar flare from an input RAW digital image.

FIGS. 3-5 depict stages of removing image overlays. In some examples, the stages depicted in these figures are performed in a different order than described below.

FIG. 3 depicts an example 300 of receiving an input RAW digital image 120 and an additional RAW digital image 122. As illustrated, the reflection removal module 116 receives an input 118 including an input RAW digital image 120 and an additional RAW digital image 122.

In this example, the input RAW digital image 120 is captured by an image capture device. In this example, the input RAW digital image 120 is formed by aligning and merging a burst of initial RAW digital images. The input RAW digital image 120 depicts a window display featuring a record player that a user attempts to capture in a photograph. However, the window between the record player and the image capture device creates a reflection of the user taking the photograph. The input RAW digital image 120 therefore inadvertently includes two layered images. The first layer is a base image featuring the record player. The second layer is an overlay image featuring the reflection of the user in the window.

The reflection in the input RAW digital image 120 is undesirable and unaesthetic. Reflections are caused by interaction of light with a surface of glass or another smooth surface. When light travels from one medium (including air or another material) to another with a different refractive index (a measure of how much light bends when passing through a material), some of the light is reflected at the interface between the two materials, while some of it is transmitted into the new material. In other examples, the input RAW digital image 120 includes glare. Glare is a visual phenomenon characterized by excessive and uncomfortable brightness or intense light reflections on a surface of glass or other transparent materials. Glare occurs when light from a bright source, such as the sun or artificial lighting, is reflected off the glass surface and enters an eye making it difficult to see objects behind or beyond the glass.

The additional RAW digital image 122 is an optional supplement to the input RAW digital image 120 that is captured from a different angle than the input RAW digital image 120. In this example, the additional RAW digital image 122 depicts a building across the street from the window depicted in the input RAW digital image 120. For example, the additional RAW digital image 122 is captured by the image capture device at the location the input RAW digital image 120 is captured from an angle of 180 degrees of rotation from the image capture position of the input RAW digital image 120. In other examples, however, the additional RAW digital image 122 is captured from any angle that is different from the image capture position of the input RAW digital image 120. In other examples, the additional RAW digital image 122 is a "selfie" capturing an image of the user.

In this example, the additional RAW digital image 122 features different lighting from the input RAW digital image 120. For example, the content behind the window in the input RAW digital image 120 is exposed to artificial lighting inside a shop, while the content depicted in the additional RAW digital image 122 is exposed to natural lighting outside the shop. This contrast in lighting between the input RAW digital image 120 and the additional RAW digital image 122 is used by the segmentation module 206 described in further detail below.

FIG. 4 depicts an example 400 of segmenting a base image 202 from an overlay image 204. FIG. 4 is a continuation of the example described in FIG. 3. After the reflection removal module 116 receives the input RAW digital image 120 and the additional RAW digital image 122, the segmentation module 206 segments a base image 202 from an overlay image 204 in the input RAW digital image 120.

For example, the segmentation module 206 uses a machine learning model 208 to differentiate content in the input RAW digital image 120 that includes the base image

202 from content that includes the overlay image 204. The machine learning model 208 is trained to differentiate between different images that are combined together. To do this, the machine learning model 208 is trained on training data 210 that includes artificial RAW composite digital images that are formed by combining two or more existing RAW digital images. After the existing RAW digital images are combined, the reflection removal module 116 processes the resulting images by emulating a camera processing pipeline so that the training data 210 is in a format of the input RAW digital image 120.

The training data 210 simulates multiple properties, including illuminant color and photometric power of light. For example, an illuminant or light source differs between reflection and transmission scenes because glass is predominantly used to separate indoor and outdoor spaces. Accurate simulation of illuminant color therefore includes mixing illuminant colors together before white balancing occurs. Regarding the photometric power of light, transmission and reflection scenes are different (e.g., indoor spaces are dark compared to broad daylight). For example, the number of photons that strike a camera sensor depend on the camera shutter speed s, aperture n, and sensitivity (ISO) I, which form the camera exposure $e=s\cdot i/n^2$, which linearly scales the number of captured photons into the range of the sensor. This linear scaling is removed by dividing t and r by e to recover an unexposed image in which non-saturated pixel values represent the integral of the radiant flux, up to a constant of proportionality that is consistent between r and t. Combining the above properties, a simulated mixture image $m'=t/e_t+r/e_r$ is obtained, where $e_t$ and $e_r$ are the exposures of the transmission and reflection images. The mixture m is accurate with respect the color and power of the captured light, but it is neither exposed nor white balanced. A new exposure for m' is computed, and the image is then re-white balanced, transforming m' into a final simulation example m in the ideal case in which neither t nor r contain saturated pixels. When pixels are saturated, the new exposure is computed as:

$$1/e'=\min(\max(t/e_t),\max(r/e_r))$$

with saturated pixels in t and r remain in m=e'm'. A large dataset of RAW images is collected, from which t and r are randomly drawn, and a search for pairs (t, r) yields examples that are well exposed and well mixed. Well exposed observed mixtures m are identified by computing the mean pixel value of m and discarding m if this mean is extreme under an empirically determined normal distribution. Well mixed reflections are identified by computing a block-wise SSIM value between m and t, and checking if its mean is within a useful range. This single channel SSIM is computed as the weighted average of the per-channel SSIM, with the pixel color determining the weight, accounts for strongly colored regions. Additionally, the standard deviation of the block-wise SSIM values is also checked to eliminate imperceptible reflections that nonetheless produce a low mean SSIM by spreading their power broadly across the image. By applying these filters, the reflection removal module 116 obtains a simulation that yields a useful photometrically accurate example for the training data 210, given pair of RAW digital images, (t, r).

In examples that include the additional RAW digital image 122, the machine learning model 208 compares the additional RAW digital image 122 to the input RAW digital image 120 to segment the base image 202 from the overlay image 204. This is because the additional RAW digital image 122 includes information usable to determine differences between the base image 202 and the overlay image 204. For example, the additional RAW digital image 122 depicts content with more visual similarities to the overlay image 204 than the base image 202. This is because the additional RAW digital image 122 is captured facing toward content reflected into the input RAW digital image 120 via the overlay image 204.

In some examples, the machine learning model 208 segments the base image 202 from the overlay image 204 based on differences in brightness between the base image 202 and the overlay image 204. For example, brightness refers to a visual perception of intensity of light. Brightness is described as the extent to which an object or a light source emits or reflects light.

In other examples, the machine learning model 208 segments the base image 202 from the overlay image 204 based on differences in a color spectrum between the base image 202 and the overlay image 204. The color spectrum of natural light, including sunlight or daylight, differs from the color spectrum of artificial light sources, including fluorescent, like arterial lights when taking a photo. These differences have a notable impact on the colors and overall quality of the photograph. For example, natural light sources like sunlight have a color temperature that varies throughout the day but is generally considered "white" or "neutral." Daylight appears bluish in the morning and evening and more neutral around midday. Alternatively, indoor lighting comes from various sources with different color temperatures. Common indoor lighting types include incandescent bulbs, compact fluorescent lamps (CFLs), and light-emitting diodes (LEDs), which range from warm white to cool white. Additionally, specialty lighting sources including fluorescent tubes and halogen bulbs have different color temperatures. Outdoor artificial lights, including those used for street lighting have a much warmer color temperature. This warm light tends to have a strong orange or yellowish tint. The machine learning model 208 leverages these different color spectrums and color temperatures to differentiate the base image 202 from the overlay image 204. For example, the base image 202 depicts an indoor scene through a window that is illuminated with artificial light, while the overlay image 204 depicts an outdoor scene illuminated with natural light that is "layered" over the base image 202 via a reflection in the window. Because the lighting is different in the two sources, the machine learning model 208 identifies portions of the input RAW digital image 120 that include visual properties consistent with one light source and differentiates them from different portions of the input RAW digital image 120 that include visual properties consistent with a different light source.

In this example, the machine learning model 208 segments the base image 202 from the overlay image 204 based on the input RAW digital image 120 and the additional RAW digital image 122. Although the machine learning model 208 uses multiple factors to segment the base image 202 from the overlay image 204, in this example, the machine learning model 208 leverages differences in lighting between an environment captured by in the base image 202 and an environment captured in the overlay image 204. For instance, the intended subject of the input RAW digital image 120 is the record player inside the shop window that the user is facing while capturing the input RAW digital image 120. The inside of the shop in this example is illuminated with artificial light that has a cool white color. The street area outside the shop that is reflected onto the shop window is illuminated with natural light that has a warm color. The machine learning model 208 also uses inferences drawn from the additional RAW digital image 122 to determine visual properties of the overlay image 204. Because the two scenes include different lighting, the machine learning model 208 differentiates between content in the input RAW digital image 120 with a cool white color as the base image 202 and content with a warm color as overlay image 204. In this example, the base image 202 depicts the record player, and the overlay image 204 depicts content from the reflection in the input RAW digital image 120. For example, the overlay image 204 depicts the user taking the photo. Although the machine learning model 208 uses differences in lighting between the input RAW digital image 120 and the additional RAW digital image 122, the machine learning model 208 uses other factors, observations, or data to segment the base image 202 from the overlay image 204.

In some examples, the segmentation module 206 transforms pixel values from the additional RAW digital image 122 into a color space and an exposure of the input RAW digital image 120 to compare the additional RAW digital image 122 to the input RAW digital image 120. Additionally, in some examples the segmentation module 206 conducts white balancing on the additional RAW digital image 122 based on white values of the input RAW digital image 120 to compare the additional RAW digital image 122 to the input RAW digital image 120. In some examples, the segmentation module 206 exposes the additional RAW digital image 122 based on the exposure of the input RAW digital image 120. Based on this, the machine learning model 208 discerns whether the reflected content is dark and whether the reflected content creates a reflection.

In some examples, the reflection removal module 116 generates training data 210 to train the machine learning model 208 for situations involving the additional RAW digital image 122. For example, to generate artificial images that simulate the input RAW digital image 120 and the additional RAW digital image 122, the reflection removal module 116 combines a sample RAW digital image with one half of an additional sample RAW digital image. For example, the one half of the additional sample RAW digital image overlays the sample RAW digital image and has a degree of transparency to replicate an input RAW digital image 120 as training data 210. The reflection removal module 116 uses a remaining half of the additional sample RAW digital image to replicate an additional RAW digital image 122 as training data 210. This generates one training image by combining the one half of the additional sample RAW digital image with the sample RAW digital and generating a second training image using the remaining half of the additional sample RAW digital image. During training, the machine learning model 208 segments a base image 202 and a overlay image 204 from the one image based on the second image. This reduces a likelihood that the machine learning model 208 "cheats" by segmenting the base image 202 from the overlay image 204 if the base image 202 and the overlay image 204 were known. For example, source images $i \in I$ are cropped into two halves ($i_a$, $i_b$) that embody the (virtual) primary and (real) selfie views of the reflection scene. Splitting $Vi \in I$ yields a dataset of photometrically simulated pairs (m, s) of mixture m and selfie s images, ($m(i_x, j_a)$, $j_b$) where $m(i_x, j_b) = T(i_x) + R(j_a)$ for $x \in \{a, b\}$. For instance, the synthetic images are added together as (t, r), and the source image pairs as (i, j)$\in$D. Images t=T(i) and r=R(j) are synthesized by modeling Fresnel attenuation, perspective projection, double reflection, and defocus, as discussed below. In RAW pairs (m, s), the "pseudo-selfie" s is photometrically calibrated to use the white point and exposure of the mixture m and therefore contains photometric information about the scene brightness and illuminant color, in addition to the scene semantics (e.g., outdoors, indoors, city, nature).

After the base image 202 and the overlay image 204 are identified, the segmentation module 206 separates the overlay image 204 from the base image 202. In this example, because the user desires an image of the record player without the reflection in the window, the reflection removal module 116 generates an output RAW digital image 130 using the base image 202. Alternatively or additionally in some examples, the reflection removal module 116 generates the output RAW digital image 130 using the overlay image 204.

In some examples, the reflection removal module 116 further processes the output RAW digital image 130, including writing a new RAW image file in a digital negative (DNG) format and saving the DNG file to disk memory. The reflection removal module 116 performs a variety of processing steps to generate a finalized image for use by the user. For example, the reflection removal module 116 performs operations to linearize, demosaic, highlight recovery, subtract black level, convert to XYZ color, white balance, convert to RGB color, and non-linearly process the output RAW digital image 130. In some examples, the reflection removal module 116 also crops, straightens, or applies filters to the base image 202 to generate the output RAW digital image 130. Although this example involves finalizing the base image 202, in some examples, the base image 202 and the overlay image 204 are both output as finished separate images. In other examples, the overlay image 204 is used to generate the output RAW digital image 130.

In some examples, separating the overlay image 204 from the base image 202 results in gaps with no content in the base image 202, the overlay image 204 or both. For example, a heavy reflection in the overlay image 204 of the input RAW digital completely covers up a portion of content of the base image 202. After the overlay image 204 is removed, the base image 202 includes a gap with no content. In this example, the machine learning model 208 generates content to replace a portion of the input RAW digital image 120 that was removed during removal of the overlay image 204. For example, the machine learning model 208 uses Adobe Firefly or other creative generative machine learning model to generate content to "fill in" the gap in the base image 202 based on other content in the base image 202.

In some examples, the reflection removal module 116 uses geometric simulation to construct photometrically accurate composites from a dataset of RAW images. For example, the reflection removal module 116 models transmission images t=T(i) and reflection images r=R(j) as a functions of images i, j∈ I. The reflection removal module 116 models Fresnel attenuation, camera projection, double reflection, and defocus blur.

For example, Fresnel attenuation reduces the intensity of the reflected image. Pixel values in RAW images are linearly proportional to the intensity of light in a scene. Regarding Fresnal attenuation, the reflected intensity is attenuated by a factor α that depends on an angle θ at which a ray strikes the glass with respect to the surface normal vector:

$$\alpha = \frac{1}{2}(\alpha^{\perp} + \alpha\|)$$

-continued $$\alpha^{\perp} = \frac{\sin^2(\theta - \theta_t)}{\sin^2(\theta + \theta_t)}$$

$$\alpha\| = \frac{\tan^2(\theta - \theta_t)}{\tan^2(\theta + \theta_t)}$$

where $\theta_t$=arcsin (1/K sin θ), and K=1.474 is the reflective index of glass. To specify θ, images i∈ I are defined being reflected from a mirror surface toward a camera. Using the law of reflection, the angle that these reflected rays make with the glass surface normal vector is equal to the angle of the incident rays from the reflection scene. Therefore, the rays from the camera center of projection through each pixel, in conjunction with the glass surface normal vector, define θ and the Fresnel attenuation factor α.

To model camera projection, the reflection removal module 116 models a relative inclination angle between the camera and the glass. Because glass involved in consumer photography is approximately vertical, the reflection removal module 116 runs a pose estimator on i∈ I to recover the camera inclination angle, and in some examples gyroscope data is also used. The inclination of the simulation camera is set to match the estimated inclination. Furthermore, the search is augmented for photometrically compatible (t, r) pairs of images by checking if the inclination angles for t and r are approximately equal. If the real camera that defines t looks upward, the virtual camera that defines r looks upward as well. This introduces natural priors where reflection content is superimposed within t (e.g., skies usually reflect over ceilings, not floors), and in relation to the Fresnel attenuation map (e.g., skies are typically near the top, where the Fresnel coefficient is relatively larger). Regarding modeling the azimuthal angle between the camera and glass, photographs are rarely taken through glass at a high angle (e.g., 85°) to capture a subject of any importance on the other side. Instead, photographs are taken from a frontal vantage point. For example, the Fresnel attenuation factors make it difficult to see through glass at high angles. Glass involved in consumer photography is roughly planar, which constrains the camera azimuth and field-of-view (FOV) so that the camera rays strike the plane in which the glass lies (i.e., the vanishing line of the plane falls outside of the sensor area). The azimuth angle and FOV are drawn uniformly at random in a fixed range. Random samples of the azimuth angle and the FOV are culled if the combined effect of the azimuth angle, the FOV, and the estimated inclination angle produce camera rays that do not strike the virtual glass pane.

Regarding double reflection, glass panes introduce multiple reflective surfaces that create a double reflection or "ghosting" effect. This results from the thickness of a single pane, or a double-pane window, which produce shifts up to 4 pixels for thicknesses in [3, 10] mm. Air gaps between panes reach 20 mm, not including the thickness of the panes, which reach 7 mm. Furthermore, double-window panes are not necessarily parallel or flat. For instance, differing surface normals on the first and second reflecting surfaces shift secondary reflections. These factors combine to produce significant double reflections that are observed in modern windows even when the camera is distant from the glass. These complex effects are simulated using a geometric model that allows a greater range of glass thicknesses. For example, a glass thickness, a physical viewing distance, and a glass refractive index are sampled uniformly at random. These parameters facilitate a ray tracing procedure. The primary reflection is determined by the Fresnel attenuation $\alpha i$ for $i \in I$, described above. Specifically, the intensity of light at each image coordinate x is $\alpha(x)i(x)$, because $i(x)$ is defined as encoding the light along the incident rays r with $\angle(x, r)=2\theta$ where $\theta$ is the angle of incidence. A second reflection is simulated by tracing the camera rays x through a simulated single pane of uniform thickness to identify the coordinates x' at which they would emerge from the glass after being internally reflected from the back surface of the pane. Coordinates x' are shifted according transit distance within the glass, which is determined by the geometry of reflection and Snell's law. Rays that enter the glass at x emerge at x' in direction r. To generate an image i'(x') to describe the intensity of incident light in direction r, i is geometrically warped such that coordinates $x' \rightarrow x$ because $i'(x') \neq i(x')$, $i(x')$ describes the light in direction r', and the light field is sufficiently smooth to use $i'(x') \approx i(x')$, since $\angle(x, x')=\angle(r, r')$ is small. The warped image $i_w$ is combined with i to produce a double reflection. The double reflection image is given by $i_d=\alpha_i+\beta i_w$, where $\alpha$ is the known Fresnel attenuation due to the primary reflection, and $\beta$ specifies the attenuation of the rays that travel into the glass before the rays are internally reflected back to the camera. The reflected rays encounter three surfaces and lose intensity at each surface. The first surface the rays encounter is the front face of the glass, where the rays are mildly attenuated by $1-\alpha$ as the rays transmit into the glass. The second surface the rays encounter is the back face, where the rays reflect and are attenuated again according to their angle of incidence, which is altered by Snell's law. The change of incidence angle, however, has a negligible effect on the Fresnel attenuation factor within the typical incidence ranges. Therefore, the reflection removal module 116 uses $\alpha$ as the attenuation at the second surface. The third surface the rays encounter is the front face of the glass (now from within) where the rays transmit out of the glass and are attenuated again by approximately $1-\alpha$, giving $\beta=(1-\alpha)\alpha(1-\alpha)$.

Defocus blur results from varying depths of objects in a scene, aperture of the camera, and a depth at which a camera is focused (i.e., the focal length). Points on an object at depth $d_o$ that differs from the depth $d_f$ at which the camera are focused to a region in the image modeled as a circle with diameter c, $$c = \frac{|d_0 - d_f|}{d_0} \frac{f^2}{N(d_f - f)}$$

where f is the focal length of the camera, and N is the aperture f-number. This circle is magnified with increasing focal length f or aperture, inversely proportional to N. The defocused images are simulated by randomly sampling diameters c for the circle of confusion, according to typical imaging conditions in consumer photography. The focal length f and aperture N are sampled according to the values found in modern mobile cameras. The object and focus depths $d_o$ and $d_f$ are then sampled uniformly at random in $[d_{min}, d_{max}]$, the plausible and finite range of scene depths to which c is sensitive. To compute c with physically accurate dimensions, the distances are expressed in millimeters (mm), and focal lengths are specified in mm relative to a 35 mm film, producing a diameter $c_{mm}$ relative to a 35 mm film, which is converted to a percentage c of the image by dividing by the height of the smartphone sensor (also expressed in terms of a 35 mm film). Images $I \in I$ in the dataset are blurred by convolving with a circular defocus kernel with pixel diameter d=ch, where h is the height (minimum dimension) of the image in pixels. This process of converting physically dimensioned circles of confusion into convolution kernels expands the effective dataset size of the training data 210 to include a domain of plausibly blurry images.

In some examples, the reflection removal module 116 uses high dynamic range (HDR) environment maps as a readily available source of RAW imagery for simulating photometrically accurate reflection images for reflections in which human-made lights appear as semi-transparent reflections. When well-exposed RAW images are used, human-made lights are saturated and cannot be used to simulate photometrically accurate, semi-transparent light source reflections. HDR images are constructed from underexposed RAW images at the required exposure compensation levels. Photometrically realistic reflections are simulated with datasets composed entirely of RAW photos, provided that some RAWs are captured at −4 stops. When pairs $(i, j) \in I$ involve a HDR environment map, a synthetic camera is constructed with an inclination angle and field of view that match the RAW image. The environments are captured under a fixed white point, which allows for colored illuminants to be mixed with the RAW data. Lastly, the median intensity of the HDR environments is set to match the median value of the indoor RAW images (the median is used to contend with saturated values in the RAW images). The result is a cropped HDR image that is transformed into a transmission or reflection image using the simulation functions T or R.

FIG. 5 depicts an example 500 removing a solar flare 502 from an input RAW digital image 120. The solar flare 502 is a type of optical artifact that occurs when taking pictures in the presence of bright light sources, including the sun. Solar flares in digital images are unwanted, bright spots or streaks that result from light hitting the camera lens at certain angles or reflecting off internal lens elements.

In this example, the reflection removal module 116 receives an input RAW digital image 120 that includes a solar flare 502, which is an undesirable white spot on the input RAW digital image 120. To remove the solar flare 502, the segmentation module 206 uses a machine learning model 208 to segment a base image 202 that includes a primary portion of the input RAW digital image 120 from the overlay image 204, which includes the solar flare 502. For example, the machine learning model 208 is trained on training data including multiple artificial images formed by combining base images with overlay images that include solar flares. Based on the training data, the machine learning model 208 predicts what portion of the input RAW digital image 120 includes the base image 202 and what image includes the overlay image 204 with the solar flare 502. After identifying the base image 202, the reflection removal module 116 generates an output RAW digital image 130 based on the base image 202 without the solar flare 502 from the overlay image 204.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5.

Figure 6:
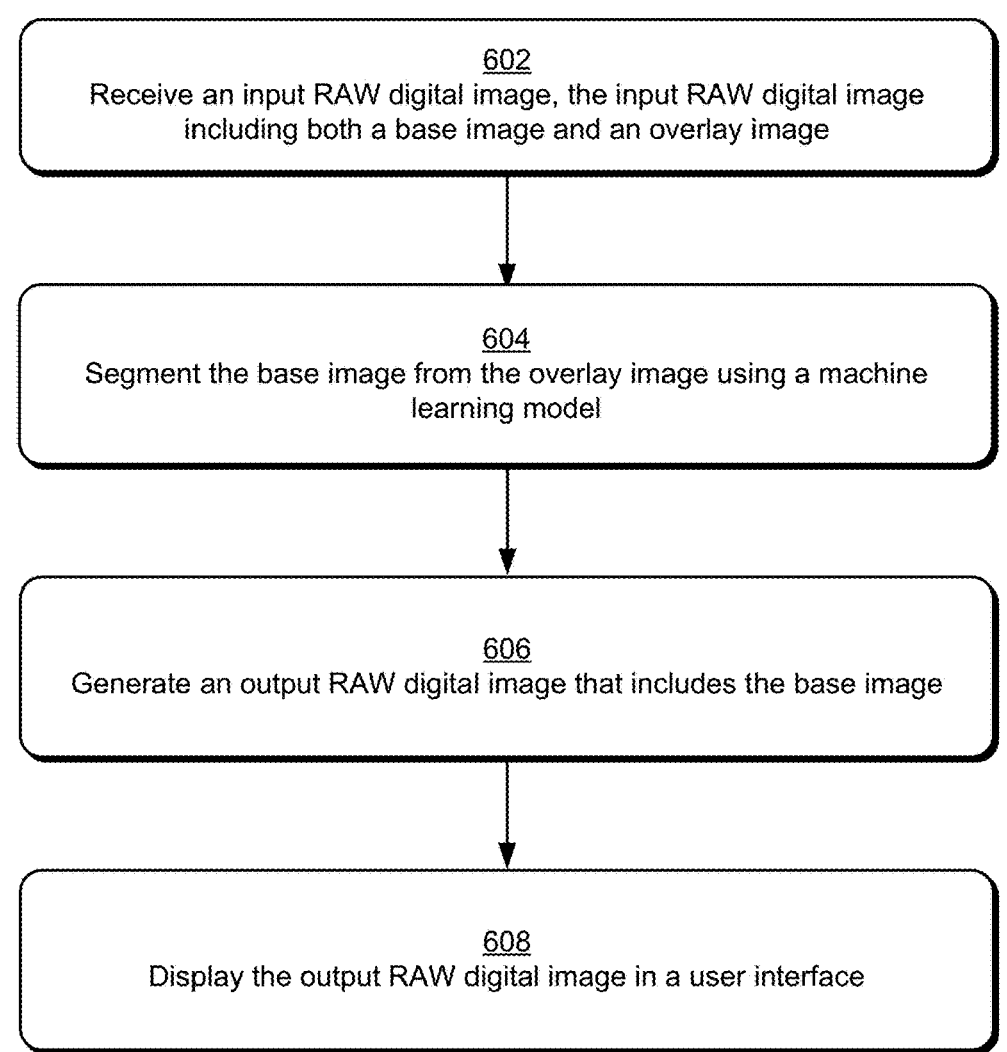
FIG. 6 depicts a procedure in an example implementation of removing image overlays.

FIG. 6 depicts a procedure 600 in an example implementation of removing image overlays. At block 602, an input RAW digital image 120 is received, the input RAW digital image 120 including both a base image 202 and an overlay image 204. For example, the overlay image 204 depicts a reflection and is layered over the base image 202 in the input RAW digital image 120. In some examples, an additional RAW digital image 122 is received that is captured from an angle used to capture the input RAW digital image 120. Additionally or alternatively, the input RAW digital image 120 and the additional RAW digital image 122 are captured simultaneously by different cameras. For example, the additional RAW digital image 122 includes information about light in a physical environment captured by the input RAW digital image 120.

At block 604, the base image 202 is segmented from the overlay image 204 using a machine learning model 208. In some examples, the machine learning model 208 segments the base image 202 from the overlay image 204 based on the information about the light in the physical environment from the input RAW digital image 120. For example, the machine learning model 208 is trained on RAW digital images formed by combining two RAW digital images.

At block 606, an output RAW digital image 130 is generated that includes the base image 202. Some examples further comprise generating digital content using the machine learning model 208 to replace the overlay image 204 in the output RAW digital image 130. Additionally or alternatively, some examples further comprise generating an additional output RAW digital image that includes the overlay image 204.

At block 608, the output RAW digital image 130 is displayed in a user interface 110.

FIG. 7 depicts a procedure 700 in an additional example implementation of removing image overlays. At block 702, an input digital image captured by a rear facing camera is received, the input digital image including both a base image 202 and an overlay image 204. For example, the overlay image 204 depicts a reflection and is layered over the base image 202 in the input digital image.

At block 704, a second digital image captured by a forward facing camera is received. In some examples, the second digital image is captured from an angle that is different from an angle used to capture the input digital image. Additionally or alternatively, the second digital image includes information about light in a physical environment from the input digital image.

At block 706, the base image 202 is separated from the overlay image 204 using a machine learning model 208 based on content of the second digital image. In some examples, the machine learning model 208 segments the base image 202 from the overlay image 204 based on the information about the light in the physical environment of the input digital image. For example, the machine learning model 208 is trained on digital images formed by combining two digital images.

At block 708, an output digital image is generated that includes the base image 202 for display in a user interface 110. Some examples further comprise further comprising generating digital content using the machine learning model 208 to replace the overlay image 204 in the output digital image.

Example System and Device

Figure 8:
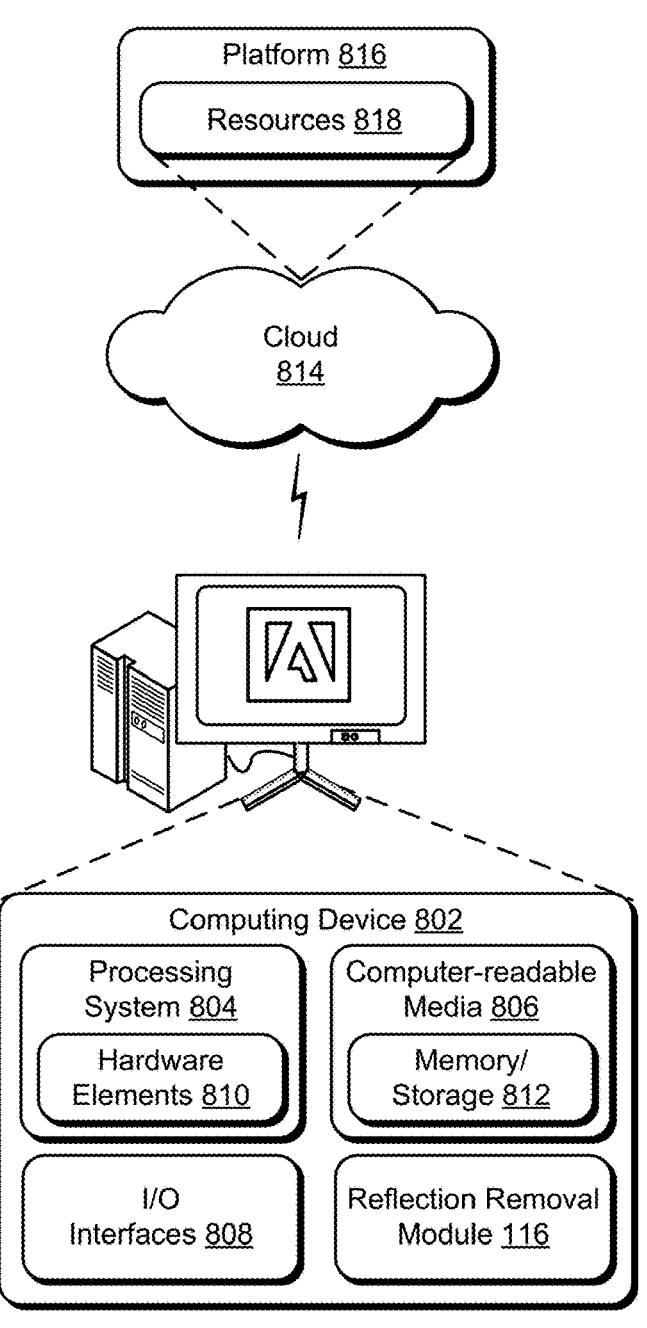
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the reflection removal module 116. The computing device 802 is configurable, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or r functions are executable/operable by one or more articles of manufacture (for example, one or more computing devices and/or processing systems 804) to implement techniques, modules, and examples described herein.

The techniques described herein are supported by various configurations of the computing device 802 and are not limited to the specific examples of the techniques described herein. This functionality is also implementable through use of a distributed system, such as over a "cloud" 1114 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized when computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

Implementation Details

The pipeline for removing reflections uses a base model and an upsampler that are trained on simulated images. This overcomes the scaling bottleneck of needing to capture real reflections. Reflections are simulated photometrically with pairs of scene-referred images, which are linear with respect to scene luminance. By contrast, images in 8-bit formats are generally display-referred, having undergone complex, proprietary, and non-linear transformations. Scene-referred images originate from sensor data that is stored in RAW format, including Adobe Digital Negative (DNG). RAW data is transformed into display-referred images using the following steps: linearize (e.g. remove vignetting) (step 1), demosaic (step 2), subtract black level (step 3), convert to XYZ color (step 4), white balance (step 5), convert to RGB color (step 6), dehaze, tone map (spatial adaptive highlights, shadows, clarity), enhance texture, adjust local contrast, hue, color tone, whites, and blacks (step 7), and Gamma compress (step 8).

For example, step 8 yields a finished image stored in 8 bits. Step 4 provides a color space where the color and intensity of light is preserved for reflection simulation. Step 7 performs proprietary non-linear, spatially varying effects that are not usefully modeled with a gamma curve as often done. Indeed, omitting Step 7 produces dramatically different images that have low contrast and dull color, which are, however, ideal for reflection synthesis.

Regarding photometric reflection synthesis, the first fundamental simulation principle is the additive property of light: glass superimposes the light field from a reflection and transmission scene to form a mixture. The resulting mixture image m=t+r accumulates (with equal weight) photons from the transmission scene into a trans-mission image t and a reflection image r. T and r are simulated from images in linear XYZ color.

The first photometric property is illuminant color, which often differs between t and r because the glass in consumer photographs typically separates indoor and outdoor spaces. Otherwise, the photographer would walk around the glass to take their photo. Even in specialized scenes like museum display cases, the case is often internally illuminated, making its illuminant color different than in the gallery at large. By representing (t, r) in XYZ color before white balancing, the illuminant colors are mixed.

The second property is the power of light. In typical scenes, the illuminant power differs on either side of the glass (t and r differ in brightness). The number of photons that strike the sensor is scaled by the exposure $e=s \cdot g/n^2$, for shutter speed s, aperture n, and gain g (ISO). The exposures of t and r are normalized so pixels are proportional to scene brightness up to a shared constant. This non-exposed mixture m' is $m'=t'+r'$, $t'=t/e_t$, and $r'=r/e_r$, for exposures $e_t$ and $e_r$. A capture function C is simulated that exposes and white balances m' by exposing the mean pixel to a target value $\tau$, $m=C(m')$, $C(m')=Wm'$, and $e'=\tau/E[m']$, where W is a 3×3 matrix that implements white balancing in XYZ. These steps are sufficient if t and r do not have saturated pixels. Otherwise, $e'=1/\min(\max(t'), \max(r'))$, to ensure that saturated pixels remain that way.

Mixtures m, above, are photometrically mixed, but are not always useful. When saturation dictates the re-exposure e', additional pixels are clipped, modeling over-exposed m. Images t' or r' also are so dark in some examples as to appear invisible, or so mutually destructive that viewers would struggle to identify the subject. These photos do not model m that photographers desire, and therefore a large dataset of images are collected and searched for (t, r) that yield well-exposed and well-mixed m. This introduces priors on m, t and r (e.g., skies often create reflections).

Regarding geometric reflection synthesis, a second fundamental principle is that, optimally, the simulated mixtures are geometrically valid. Specifically, denoting the synthetic images to be added together as (t, r) and the source image pairs as $(i, j) \in D$, $t=T(i)$ and $r=R(j)$ are synthesized by modeling Fresnel attenuation, perspective projection, double reflection, and defocus. Effects related to global color, dirt, and scratches are omitted from T since photo editing tools are capable of correcting them. A physically calibrated amount of defocus blur is modeled, finding that the reflections are sharp.

Regarding the contextual photo, optional contextual photo c is accepted that directly captures the reflection scene to help identify the reflection r. Capture of c is simultaneous with the front camera (i.e., selfie) on a mobile device, or later, in some examples. Regarding the views of c and r, even if the cameras are collocated, the viewpoints of c and r are be translated by twice the distance to the glass. If the mixture is captured obliquely to the glass, rotating the contextual view 180° yields little common content. Additionally, if the front camera is used, the reflection scene might be partially occluded by the photographer. Image c therefore often contains little matching content unless it is captured carefully. This burden is minimized by allowing c to be any view of the reflection scene. Crucially, this also facilitates geometric simulation. The image-capture function C is scalably modeled by cropping source images into a left/right half (or top/bottom). The contextual image encodes information about the lighting and scene semantics because the same capture function C is used with the same white balance as (m, t, r).

As described above, the reflection removal module 116 removes reflections from RAW images m, with an optional context image c, in linear color using the white balance of m. Both m and c share a scene-referred color space, which aids removal. T and r are predicted in the same space, and outputs are stored by inverting steps 3-6 above to produce new RAW images. The system uses two models. A base model operates on (m, c) at a low resolution, and the upsampler is used to transform the output of the base model to the same resolution as the input image.

What is claimed is:

1. A method comprising:
receiving, by a processing device, an input RAW digital image including a base image and an overlay image;
receiving, by the processing device, an additional RAW input digital image that is captured from an angle that is different from the input RAW digital image;
segmenting, by the processing device, the base image from the overlay image using a machine learning model based on a lighting condition depicted in the additional RAW input digital image that corresponds to the overlay image;
generating, by the processing device, an output RAW digital image that includes the base image; and
displaying, by the processing device, the output RAW digital image in a user interface.

2. The method of claim 1, wherein the base image is depicted through a transparent material, and the overlay image depicts a reflection on the transparent material and is layered over the base image in the input RAW digital image.

3. The method of claim 1, wherein the input RAW digital image and the additional RAW input digital image are captured simultaneously by different cameras.

4. The method of claim 1, wherein the additional RAW input digital image includes information about light in a physical environment captured by the input RAW digital image.

5. The method of claim 4, wherein the machine learning model segments the base image from the overlay image based on the information about the physical environment from the input RAW digital image.

6. The method of claim 1, wherein the machine learning model is trained on RAW digital images formed by combining two RAW digital images.

7. The method of claim 1, further comprising generating digital content using the machine learning model to replace the overlay image in the output RAW digital image.

8. The method of claim 1, further comprising generating an additional output RAW digital image that includes the overlay image.

9. The method of claim 1, wherein the lighting condition that corresponds to the overlay image is different from a lighting condition that corresponds to the base image.

10. A system comprising:
a memory component; and
a processing device coupled to the memory component, the processing device to perform operations comprising:
receiving an input digital image captured by a rear facing camera, the input digital image including a base image and an overlay image;

receiving a second digital image captured by a forward facing camera from an angle that is different from the input digital image;

separating the base image from the overlay image from the input digital image using a machine learning model based on content of the second digital image and based on a lighting condition depicted in the second digital image that corresponds to the overlay image; and generating an output digital image that includes the base image for display in a user interface.

11. The system of claim 10, wherein the base image is depicted through a transparent material, and the overlay image depicts a reflection on the transparent material and is layered over the base image in the input digital image.

12. The system of claim 10, wherein the second digital image includes information about light in a physical environment captured by the input digital image.

13. The system of claim 12, wherein the machine learning model segments the base image from the overlay image based on the information about the light in the physical environment from the input digital image.

14. The system of claim 10, wherein the machine learning model is trained on digital images formed by combining two digital images.

15. The system of claim 10, further comprising generating digital content using the machine learning model to replace the overlay image in the output digital image.

16. A non-transitory computer-readable storage medium storing executable instructions, which when executed by a processing device, cause the processing device to perform operations comprising:

receiving an input RAW digital image, the input RAW digital image including a base image and an overlay image;

receiving an additional RAW input digital image that is captured from an angle that is different from the input RAW digital image;

segmenting the base image from the overlay image using a machine learning model based on a lighting condition depicted in the additional RAW input digital image that corresponds to the overlay image;

generating an output RAW digital image that includes the base image; and displaying the output RAW digital image in a user interface.

17. The non-transitory computer-readable storage medium of claim 16, wherein the input RAW digital image is formed by aligning and merging a burst of initial RAW digital images, and the overlay image depicts a reflection and is layered over the base image in the input RAW digital image.

18. The non-transitory computer-readable storage medium of claim 16, wherein the additional RAW input digital image includes information about light in a physical environment captured by the input RAW digital image.

19. The non-transitory computer-readable storage medium of claim 18, wherein the machine learning model segments the base image from the overlay image based on information about the light in the physical environment from the input RAW digital image.

20. The non-transitory computer-readable storage medium of claim 18, wherein the machine learning model is trained on digital images formed by combining two digital images.

* * * * *